US005600546A

United States Patent [19]
Ho et al.

[11] Patent Number: 5,600,546
[45] Date of Patent: Feb. 4, 1997

[54] INPUT HARMONIC CURRENT CORRECTED AC-TO-DC CONVERTER WITH MULTIPLE COUPLED PRIMARY WINDINGS

[75] Inventors: Francis M. S. Ho, Sheung Shui; Robert C. F. Lee, Causeway Bay, both of Hong Kong

[73] Assignee: Computer Products, Inc., Boca Raton, Fla.

[21] Appl. No.: 543,561

[22] Filed: Oct. 16, 1995

[51] Int. Cl.$^6$ .................................................. H02M 3/335
[52] U.S. Cl. .............................................. 363/21; 363/89
[58] Field of Search ................................ 363/20, 21, 78, 363/80, 89, 127, 101

[56] References Cited

U.S. PATENT DOCUMENTS

| | | | |
|---|---|---|---|
| 5,331,534 | 7/1994 | Suzuki et al. | 363/20 |
| 5,343,378 | 8/1994 | Tohya | 363/21 |
| 5,442,539 | 8/1995 | Cuk et al. | 363/89 |
| 5,448,465 | 9/1995 | Yoshida et al. | 363/15 |
| 5,515,257 | 5/1996 | Ishii | 363/21 |

OTHER PUBLICATIONS

M. M. Jovanovic', et al., "Reduction of Voltage Stress in Integrated High–Quality Rectifier–Regulators by Variable––Frequency Control", 1994, Switching Rectifiers for Power Factor Correction, vol. V of the VPEC Publication Series, pp. 145–151.

Richard Redl and Laszlo Balogh, 1995 IEEE, "Design Considerations for Single–Stage Isolated Power–Factor––Corrected Power Supplies with Fast Regulation of the Output Voltage," pp. 454 through 458 (1995).

Odd Roar Schmidt, 1994 IEEE, "Quasi Resonant AC/DC Forward Converter With Sinusoidal Input Current," pp. 339 through 344 (1994).

Primary Examiner—Matthew V. Nguyen
Assistant Examiner—Adolf Berhane
Attorney, Agent, or Firm—Skjerven, Morrill, MacPherson, Franklin and Friel L.L.P.; T. Lester Wallace

[57] ABSTRACT

An AC-to-DC power converter achieves greater than 80 percent power factor correction with greater than 75 percent efficiency using only one power switch, only one magnetic component, only one control loop, and a storage capacitor. The only magnetic component is a transformer having first primary winding, a second primary winding, and at least one secondary winding. During a first time interval of the period of the AC input current, the second primary winding is energized with energy previously stored in a storage capacitor. During a second time interval of the period of the AC input current, the first primary winding is energized with energy of an input current flowing through the AC input terminals. As a result, the AC-to-DC power converter drawns input current for an extended period of time before the point in time when the input voltage peaks and also for an extended period of time after the point in time when the input voltage peaks. Magnitudes of input current harmonics with respect to the fundamental input current are therefore reduced with an AC-to-DC power converter having only one magnetic component.

19 Claims, 13 Drawing Sheets

(Switch On In Mode 1)

(Switch Off In Modes 1,2 and 4)

(Switch On In Modes 2,3 and 4)

(Switch Off In Mode 3)

5,600,546

INPUT HARMONIC CURRENT CORRECTED AC-TO-DC CONVERTER WITH MULTIPLE COUPLED PRIMARY WINDINGS

FIELD OF THE INVENTION

This invention relates to AC-to-DC converters.

BACKGROUND INFORMATION

AC-to-DC converters which receive power from AC power mains often rectify the sinewave (AC) mains voltage and store energy in a capacitor. The capacitor generally charges to the peak mains voltage such that current only flows into the power supply around the peaks of the input voltage. This causes the waveshape of the input current to the power supply to be a combination of the fundamental mains frequency and integer multiples (harmonics) of the fundamental mains frequency. The magnitudes of these harmonic input currents can be a substantial percentage of the magnitude of the fundamental input current. Accordingly, the harmonic input current can cause distortions which interfere with other susceptible devices connected to the power mains or can cause distortions which accumulate in distribution network elements causing undesirable stress on these elements.

Techniques, often referred to "power factor correction" (PFC) techniques, can be used to reduce the harmonic content of the input current by reforming the input current into what approximates a sinewave. Such power factor circuits are, however, generally complex.

FIG. 1 (Prior Art) is a diagram of one such power factor correction circuit. A boost converter comprising an inductor 1, a high frequency switch 2, a diode 3, a current sense resistor 4, and a control circuit 5 is interposed between the mains terminals 6 and a storage capacitor 7. The control circuitry 5 modulates the conduction of the switch 2 in order to shape the input current into what approximates a sinewave. An isolating DC-to-DC converter comprising a transformer 8, a high frequency switch 9, a control circuit 10, and an output rectifier 11 utilizes the storage capacitor 7 as a voltage source and converts the voltage on the capacitor to a usable DC output voltage level which is supplied onto output terminals 12. The control circuitry 10 of the DC-to-DC converter modulates the conduction of the switch 9 to provide regulation of the output voltage.

Although such prior art power factor correction circuits operate satisfactorily for many applications, the two separate switches 2 and 9 and two separate control circuits 5 and 10 add complexity and cost. Moreover, many applications do not require near total elimination of harmonics but merely require reduction of harmonics below values set by industry standards. A less expensive AC-to-DC converter is therefore sought which draws input currents having reduced harmonics but which does not require two control circuits and two switches.

SUMMARY

An AC-to-DC power converter achieves greater than 80 percent power factor correction with greater than 75 percent efficiency using only one power switch, only one magnetic component, only one control loop, and a storage capacitor. The only magnetic component is a transformer having first primary winding, a second primary winding, and at least one secondary winding. During a first time interval of a period of the AC input current, the second primary winding is energized with energy previously stored in a storage capacitor. During a second time interval, the first primary winding is energized with energy of an input current flowing through the AC input terminals. As a result, the AC-to-DC power converter draws input current for an extended period of time before the point in time when the input voltage peaks and also for an extended period of time after the point in time when the input voltage peaks. Magnitudes of input current harmonics with respect to the fundamental input current are therefore reduced with an AC-to-DC power converter having only one magnetic component. An additional magnetic component or components may be added for ripple and/or noise filtering.

This summary does not purport to define the invention. The invention is defined by the appended claims.

BRIEF DESCRIPTION OF THE DRAWINGS

FIGS. 9A–9I are simplified diagrams of various other embodiments.

DETAILED DESCRIPTION OF THE PREFERRED EMBODIMENTS

Figure 1:
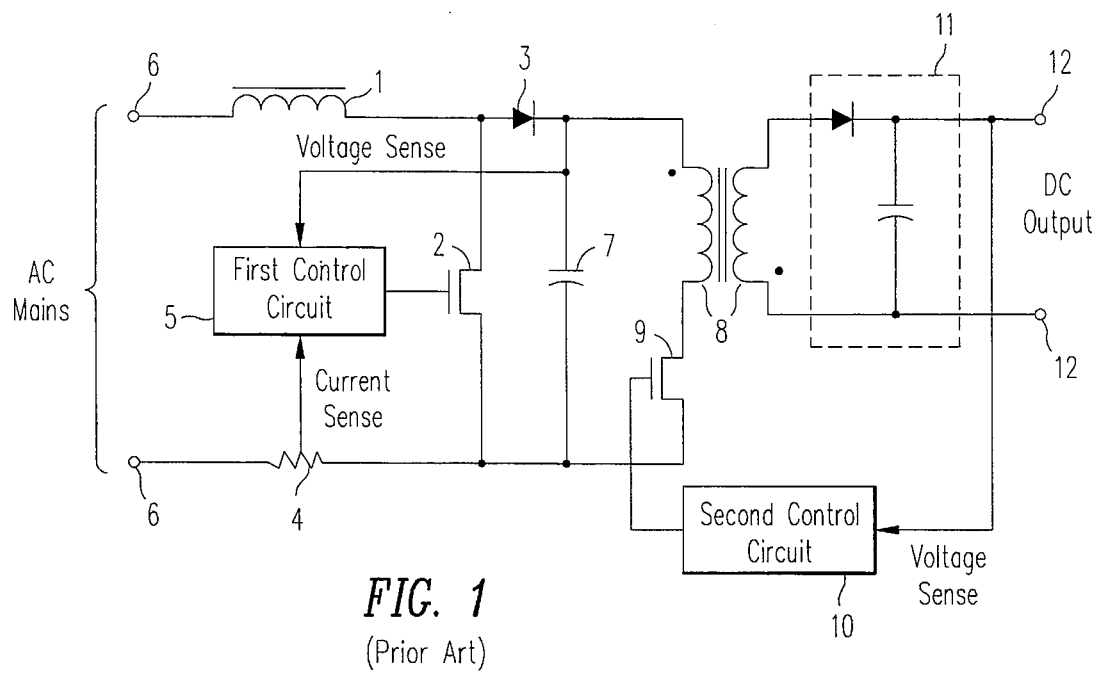
FIG. 1 (Prior Art) is a simplified diagram of a power factor correction circuit having two switches and two control circuits.
Figure 2:
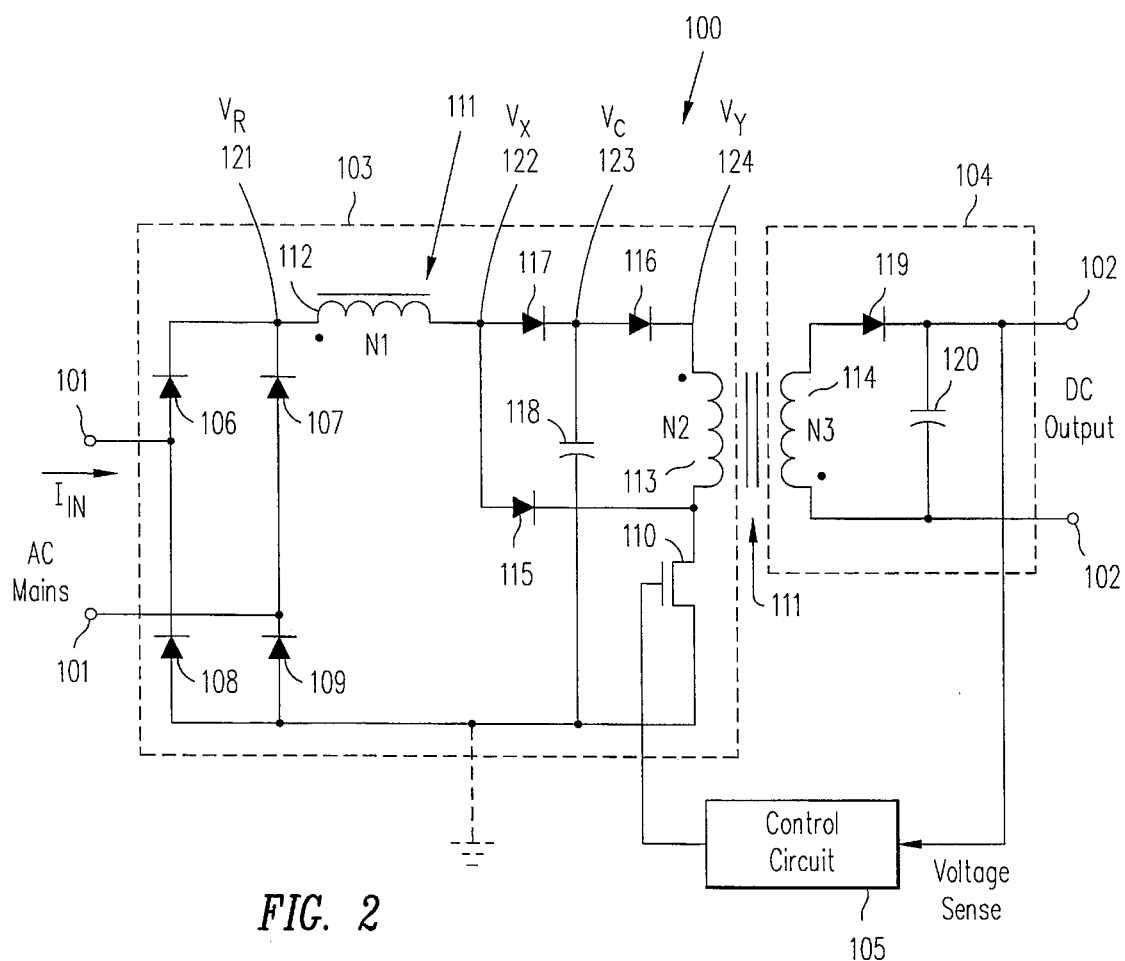
FIG. 2 is a simplified diagram of a power converter in accordance with an embodiment of the present invention.

FIG. 2 is a simplified diagram of a power converter 100 which converts AC power received on input terminals 101 into DC power output onto output terminals 102. Power converter 100 comprises a primary circuit 103, a secondary circuit 104, and a control circuit 105. Rectifier bridge diodes 106–109 rectify the AC voltage received on input terminals 101 from the AC power mains. Power converter 100 includes only one power switch component (power field effect transistor 110) and only one magnetic component (power transformer 111). Power transformer includes two primary windings 112 and 113 and a secondary winding 114. Primary winding 112 has N1 windings, primary winding 113 has N2 turns and secondary winding 114 has N3 windings. Diodes 115–117 of the primary circuit determine which primary winding is energized when the power switch 110 is conductive. Storage capacitor 118 provides energy to operate the power converter when the mains voltage is low.

The secondary circuit 104 includes a rectifier circuit 119 and 120 for rectifying the current flowing from transformer secondary 114. The control circuit 105 controls the on time of switch 110 to maintain a regulated DC voltage on the output terminals 102. The control circuit 105 may drive switch 110 with a variable frequency, with a variable duty cycle, or both. In one embodiment, the control circuit 105 is a UC3843 integrated circuit from Unitrode, pin 2 being coupled to output terminal 102, pin 6 being coupled to the gate of switch 110.

Figure 3:
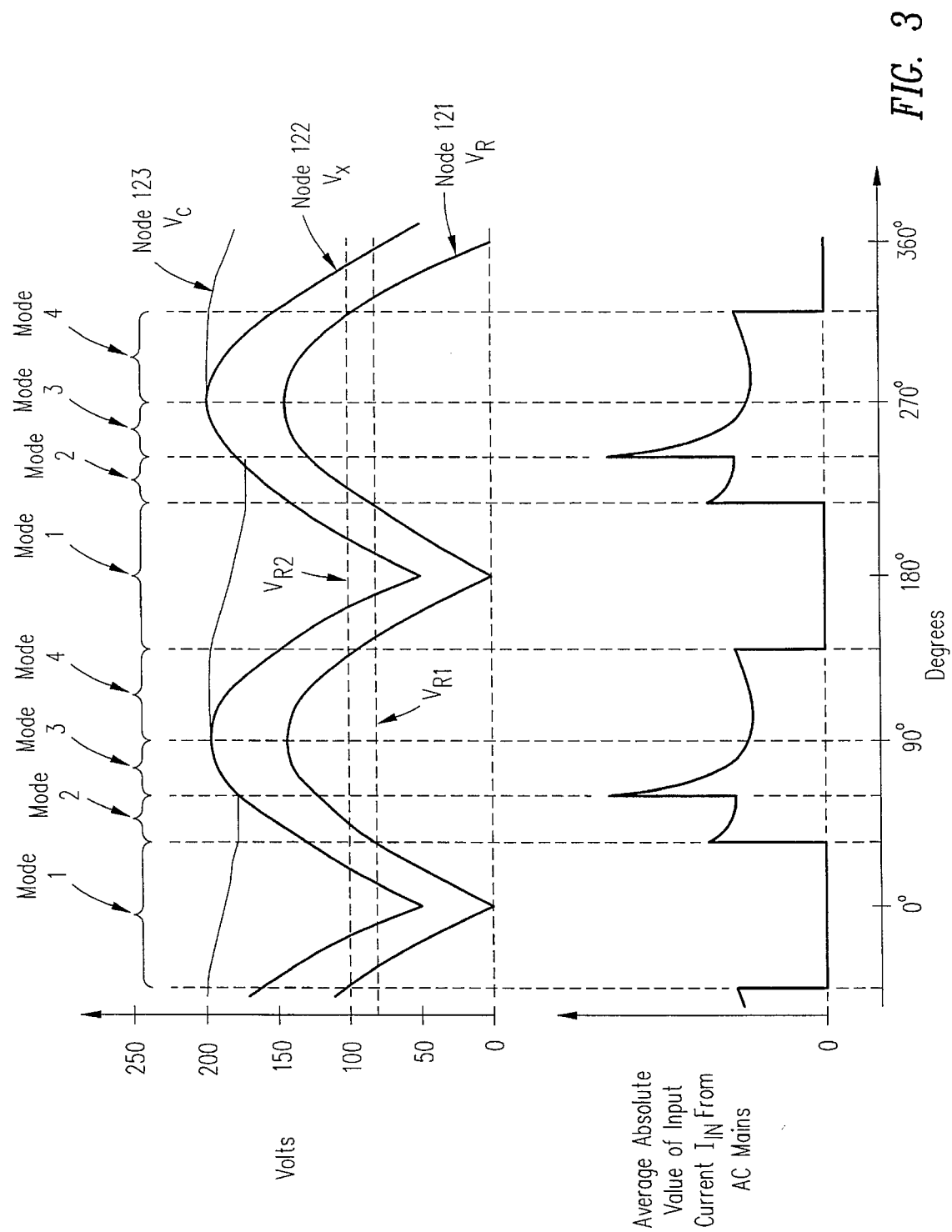
FIG. 3 is a simplified waveform diagram illustrating operation of the power converter of FIG. 2.

FIG. 3 is a simplified waveform diagram illustrating operation of the power converter of FIG. 2. Operation of the power converter 100 is described in connection with four operating modes. Switch 110 is switched on and off many times in each operating mode. In mode one, energy is transferred from the storage capacitor 118 through transformer 111 and to a load (not shown) coupled to the output terminals 102. Then in mode three, the energy that was depleted from the storage capacitor 118 is restored prior to the next mode one event.

Figure 4:
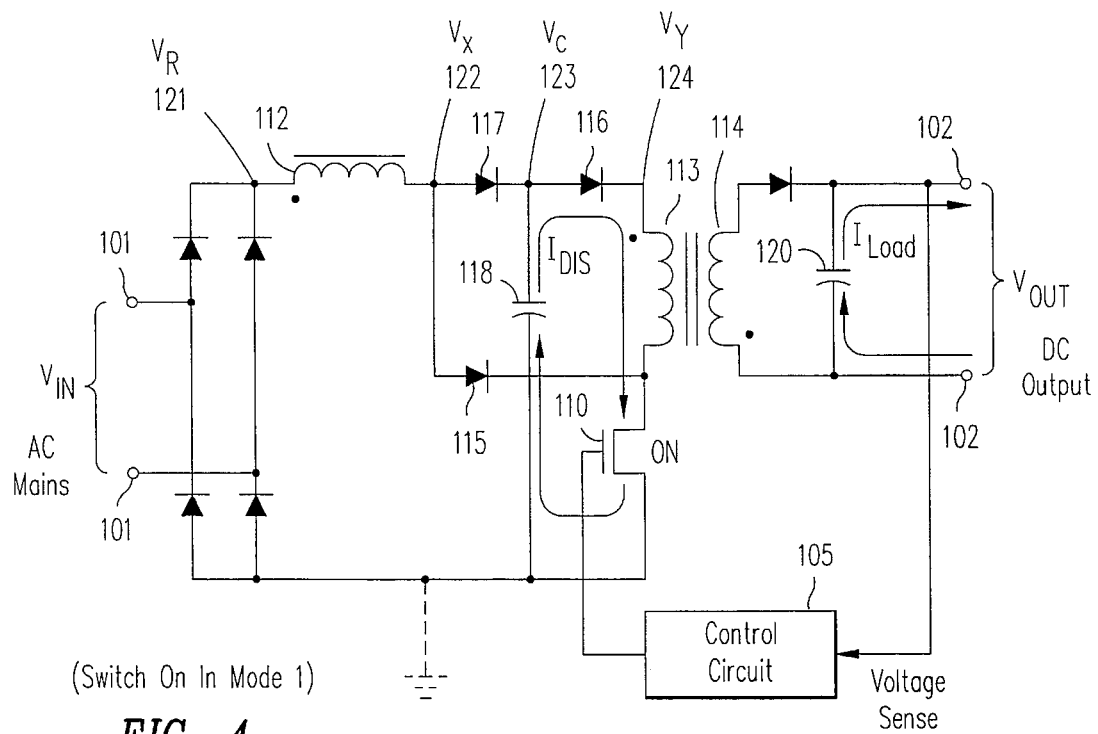
FIGS. 4–7 are simplified diagrams which illustrate current flow in the power converter of FIG. 2.
Figure 5:
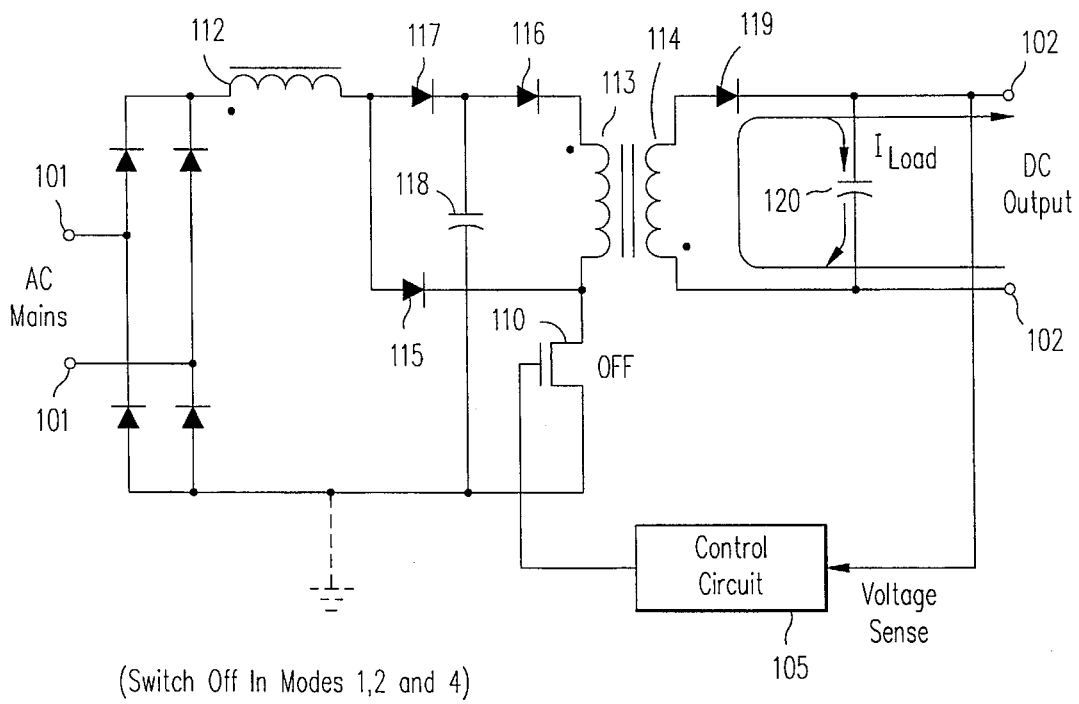

As explained above, switch 110 is switched on and off multiple times in mode one. FIG. 4 depicts current flow when switch 110 is on in mode one and FIG. 5 depicts current flow when switch 110 is off in mode one. Diodes 106–109 rectify the input voltage sinewave $v_{IN}$ so that the rectified input voltage $v_R$ depicted in FIG. 3 appears on node 121. The dashed ground symbol in FIG. 2 denotes the ground reference for the voltage waveforms of FIG. 3. The initiation condition for mode one is that the voltage $v_Y$ induced across winding 113 equals the voltage $v_C$ on storage capacitor 118, i.e.:

$$v_Y = v_C = v_R/(N1/N2) \qquad \text{(equ. 1)}$$

where $v_Y$ is the voltage induced across winding 113 during the switch 110 on time in modes 2, 3 and 4 (voltage on node 124), where $v_C$ is the voltage on capacitor 118 (voltage on node 123), where $v_R$ is the rectified input voltage (voltage on node 121), and where N1/N2 is the turns ratio of winding 112 to winding 113. For simplicity and clarity of the analysis and explanation, the diodes are considered to be ideal diodes having no forward diode voltage drop.

After the condition of equation 1 occurs, the rectified input voltage $v_R$ continues to decrease and the voltage $v_C$ on capacitor 118 remains the relatively larger voltage. Diode 116 therefore conducts and winding 113 is energized by the voltage on storage capacitor 118 when switch 110 is on as shown in FIG. 4. Energy in storage capacitor 118 is therefore depleted in mode one when the switch 110 is on. The output current $I_{LOAD}$ is supplied by the capacitor 120 of the secondary circuit during mode one when switch 110 is on.

FIG. 5 shows the current flow in mode one when the switch 110 is off. Turning switch 110 off, induces current flow in secondary 114 which charges output capacitor 120 through forward biased diode 119. Because capacitor 118 supplies energy to winding 113 when the switch 110 is on as shown in FIG. 4 and because capacitor 118 is not recharged when the switch is off as shown in FIG. 5, the voltage $v_C$ on capacitor 118 decreases in mode one. This decrease in $v_C$ (shown in FIG. 3) has an approximately linear slope defined by the average discharge current. The average discharge current $I_{DIS}$, averaged over many switching cycles, is given by:

$$I_{DIS} = I_{LOAD} \cdot V_{OUT}/v_C = C_{118} \cdot dv_C/dt \qquad \text{(equ. 2)}$$

where $I_{LOAD}$ is the average load current supplied through output terminals 102, where $V_{OUT}$ is the magnitude of the DC voltage across output terminals 102, and where $C_{118}$ is the capacitance of storage capacitor 118. The control circuit 105 modifies the duty cycle of on and off times of switch 110 in mode one to account for the decrease of voltage on capacitor 118 and to maintain a constant flow of energy to winding 113.

As shown in FIG. 3, the rectified input voltage $v_R$ decreases during mode one, reaches zero, and then begins to increase. When the rectified input voltage $v_R$ exceeds the voltage induced across winding 112 when switch 110 is on (see voltage $V_{R1}$ in FIG. 3), diode 115 becomes forward biased. At this time, the source of excitation for transformer 111 changes from primary winding 113 to primary winding 112. This is the transition from mode one to mode two. The condition for the transition to mode two is:

$$v_R = v_C \cdot N1/N2 \qquad \text{(equ. 3)}$$

Figure 6:
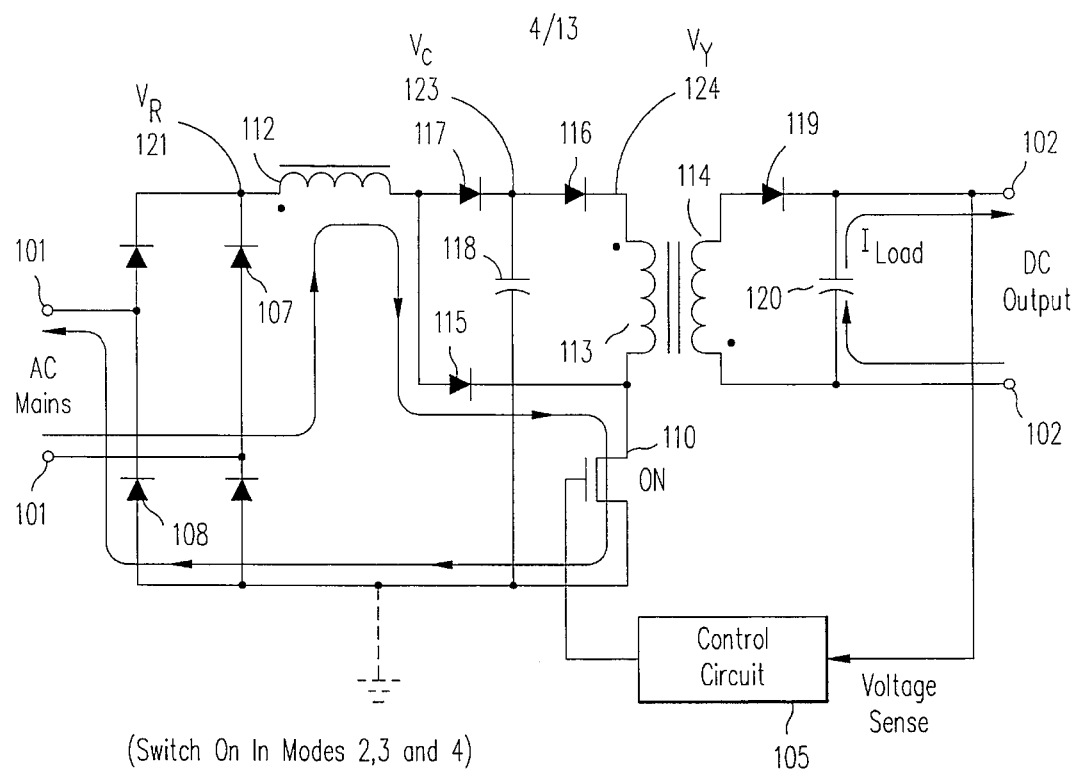

FIG. 6 illustrates circuit operation in mode two when switch 110 is on. Current flows from the AC mains, through rectifier diode 107, through winding 112, through diode 115, through conductive switch 110, back through rectifier diode 108 and back to the AC mains. Winding 112 is therefore energized.

FIG. 5 illustrates circuit operation in mode two when switch 110 is off. Turning switch 110 off induces current flow in secondary 114 which charges output capacitor 120 through forward biased diode 119.

Because no energy is drawn from storage capacitor 118 in mode two, the voltage on capacitor 118 remains constant and substantially all of the energy transferred to winding 112 from the rectified input voltage $v_R$ is transferred to output capacitor 120, the output terminals 102, and the load. The input current from the AC mains which flows through winding 112, averaged over many switching cycles, is given by:

$$i_{IN} = I_{LOAD} \cdot V_{OUT}/v_{IN} \qquad \text{(equ. 4)}$$

Because the rectified input voltage $v_R$ continues to increase with time throughout the time of mode two as shown in FIG. 3, the sum of voltage $v_R$ and the voltage across winding 112 during the off time of switch 110 also increases. When this summed voltage exceeds the voltage on capacitor 118, diode 117 becomes forward biased and current flows from the AC mains and into capacitor 118. This is the beginning of mode three. The initiation condition for mode three is:

$$v_C = v_{IN} + V_{112} = v_{IN} + V_{OUT} \cdot N1/N3 \qquad \text{(equ. 5)}$$

where $V_{112}$ is the voltage across winding 112 during the off time of switch 110. $V_{112}$ is a constant value in mode two and depends on the output voltage and the turns ratio.

Figure 7:
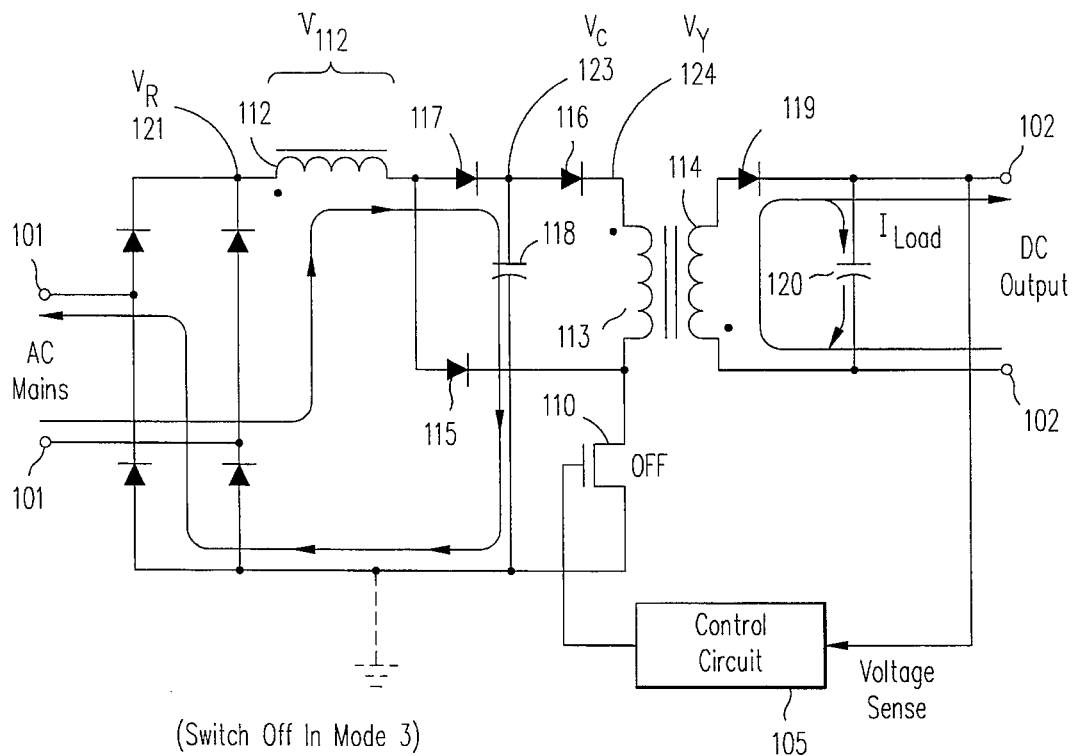
Figure 8A:
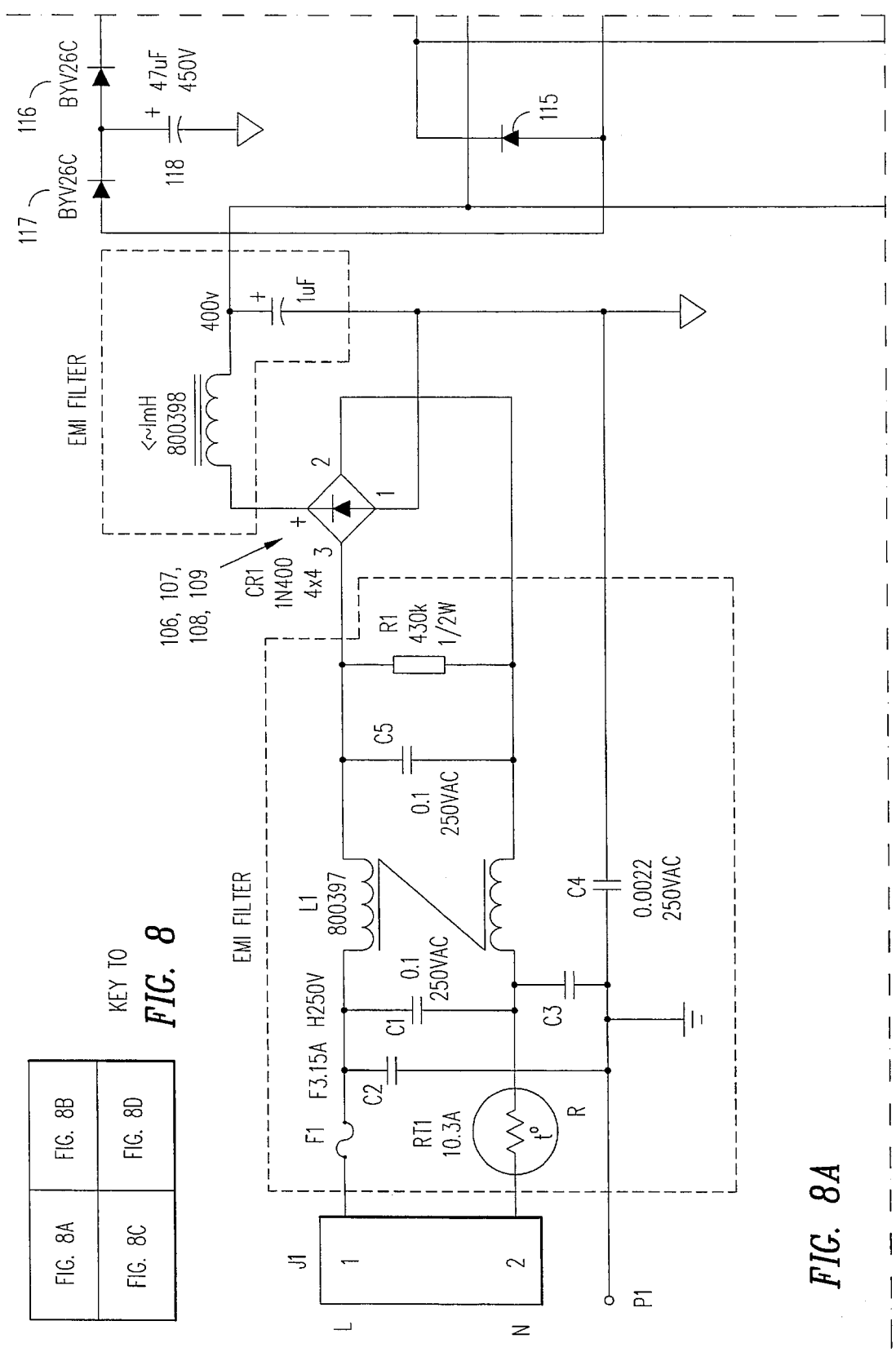
FIG. 8 is a detailed circuit diagram of a specific embodiment in accordance with the present invention.
Figure 8B:
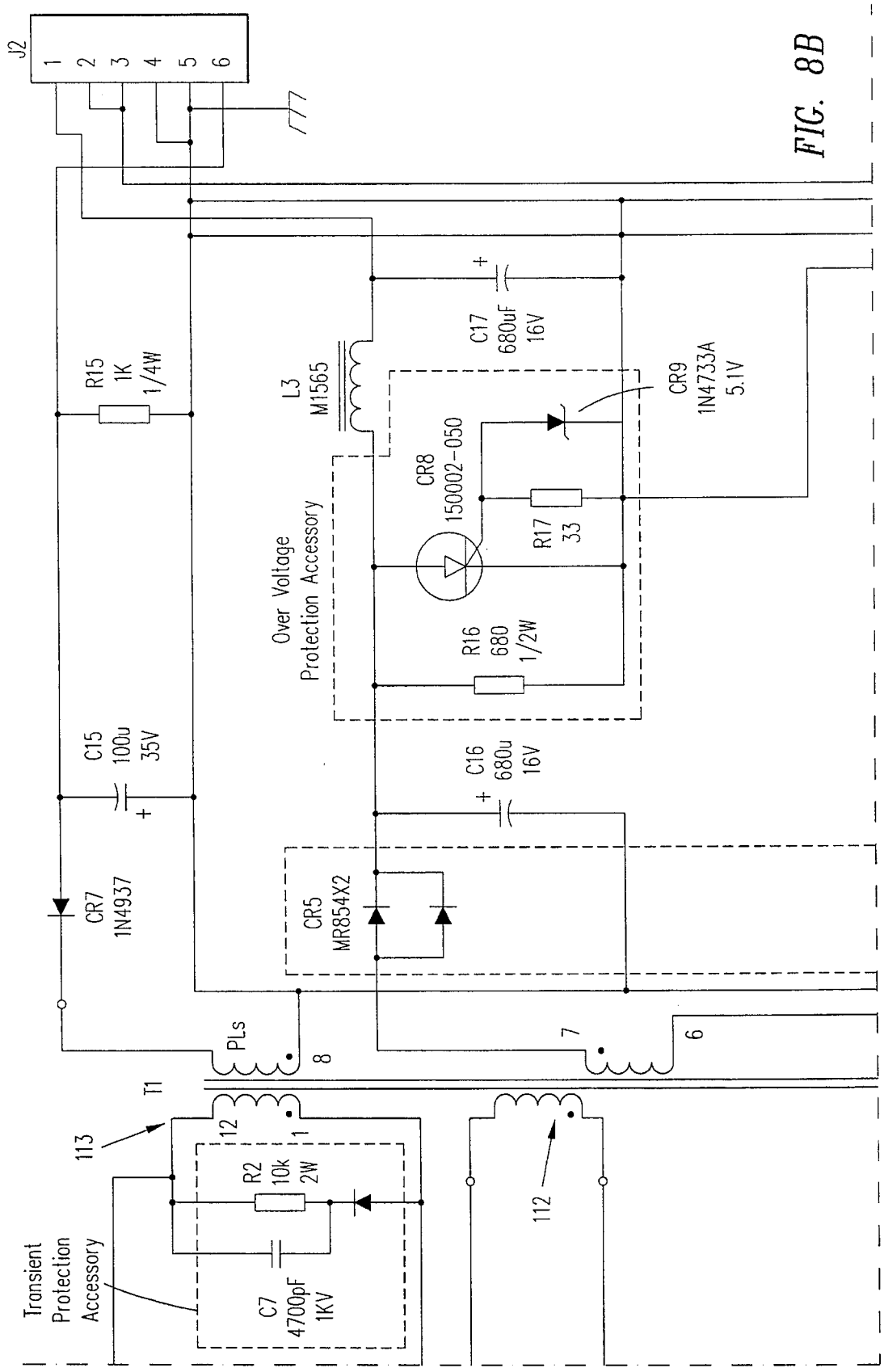
Figure 8C:
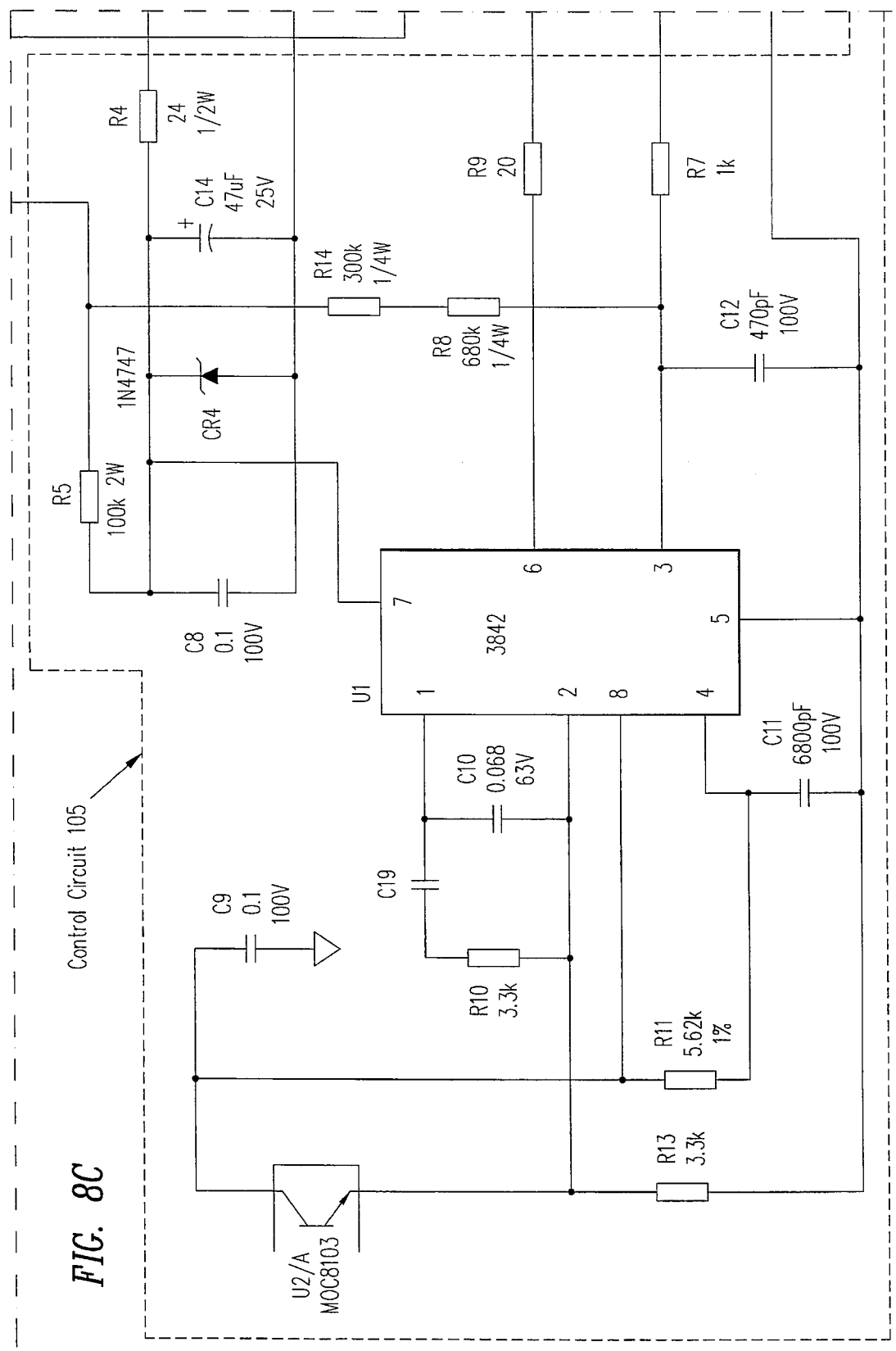
Figure 8D:
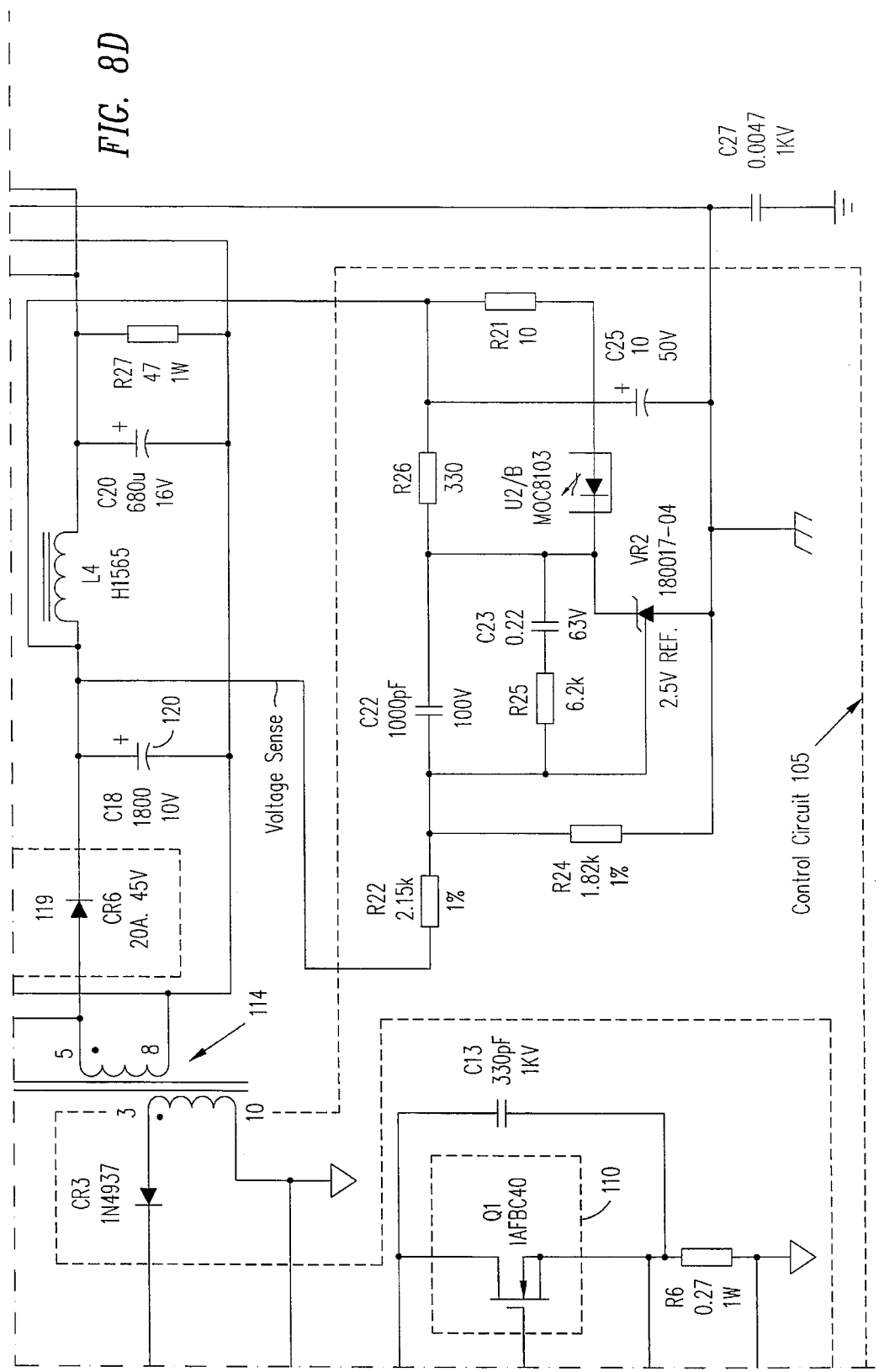

FIG. 6 illustrates circuit operation when switch 110 is on during mode three. FIG. 7 illustrates circuit operation when switch 110 is off during mode three. The energy depleted from capacitor 118 during mode one is restored in mode three. Control circuit 105 alters the duty cycle of on and off times of switch 110 to store additional energy in the inductance of winding 112 to provide for energy transfer both to the output and to restore capacitor 118. The charging current $i_{CHG}$ into storage capacitor 118 when switch 110 is off in mode three is:

$$i_{CHG} = C_{118} \cdot dv_C/dt = C_{118} \cdot d(V_{112} + v_R)/dt \qquad \text{(equ. 6)}$$

Mode four begins at the peak of the input voltage $v_{In}$ when the charging current $i_{CHG}$ into capacitor 118 ceases to flow. FIG. 6 illustrates circuit operation when switch 110 is on in mode four and FIG. 5 illustrates circuit operation when switch 110 is off in mode four. Turning switch 110 off in mode four induces current flow in secondary 114 which charges output capacitor 120 through forward biased diode 119.

Because capacitor 118 was charged to the peak voltage of the input voltage plus the voltage of winding 112 during mode three as shown in FIG. 7, diode 117 now becomes reverse biased in mode four when the input voltage starts to decrease. Diode 115, however, does conduct so that winding 112 is energized when switch 110 is on as shown in FIG. 6. Because no energy is drawn from capacitor 118, the voltage on capacitor 118 remains constant and the energy transferred to winding 112 from the input is transferred to the load. The input current is defined by equation 4 as in mode two. When the input voltage $v_{IN}$ decreases such that the conditions of equation one are obtained, mode one begins again.

As seen from the waveform of the absolute value of the input current from the AC mains in FIG. 3, the input current flows for a substantial time interval around the peak of the input voltage. This substantial time interval results in reduced harmonic content in the input current. For rectified input voltages that are adequately high (for example greater than voltage $V_{R2}$ in FIG. 3), the AC-to-DC converter operates by transferring energy from the AC mains terminals to the output terminals via the first primary 112. For rectified input voltages that are too low (for example less than voltage $V_{R1}$ in FIG. 3), the AC-to-DC converter switches to operation wherein energy stored in capacitor 118 is transferred to the output terminals via the second primary 113. The degree of conduction can be programmed by setting the ratio of N1/N2. Making N1/N2 smaller increases the number of degrees of conduction.

In one embodiment, an AC-to-DC converter in accordance with the present invention has characteristics set forth below in Table 1 for a 220 volt sinewave input voltage and a 45 watt load. Note that this AC-to-DC converter has only one switch, one magnetic component (a transformer with two primary windings), and one control loop. The turns ratio N1/N2 is approximately 0.8. The switching frequency is around 100–120 KHz and the storage capacitor is small (in terms of capacitance and size) on the order of 47 microfarads.

TABLE 1

| Power Factor | >80% |
| --- | --- |
| Total RMS Harmonic Current | <60% |
| Efficiency | >75% |
| Degrees Of Conduction | >70° |

The total RMS (root mean square) harmonic input current in the table above relates all the harmonic components of the input current (the RMS value) to the magnitude of the input current. The efficiency value in the table above is the power that is supplied to the output terminals as a percentage of power drawn from the input terminals of the AC-to-DC converter. The degrees of conduction is the total number of degrees during which significant current is being drawn from the input terminals over one period of the sinewave input voltage.

FIG. 8 is a detailed circuit diagram of a specific embodiment of an AC-to-DC converter in accordance with the present invention. Inductor 800398 and capacitor C5 are provided for filtering electromagnetic interference (EMI) of frequencies above 10 KHz. Inductor 800398 is therefore scaled to affect frequencies on the order of 1000 times the mains frequency and has a size of less than approximately 1 mH. Despite the presence of inductor 800398 between rectifier bridge diodes 106–109 and the first primary 112, inductor 800398 is merely provided for EMI filtering and is not considered part of the AC-to-DC converter. Inductor 800398 could be removed and the circuit would still operate as an AC-to-DC converter. Switch 110 is a 600 volt field effect transistor.

FIGS. 9A–9I are simplified diagrams of various other embodiments. In each of the diagrams, the AC input terminals are labeled 101, the DC output terminals are labeled 102, the rectifying diodes are labeled 106–109, the first primary, second primary and secondary are labeled 112, 113, and 114 respectively, the switch is labeled 110, the storage capacitor is labeled 118, the control circuit is labeled 105, and the output capacitor is labeled 120. Diodes 116 and 117 are also labeled.

Figure 9A:
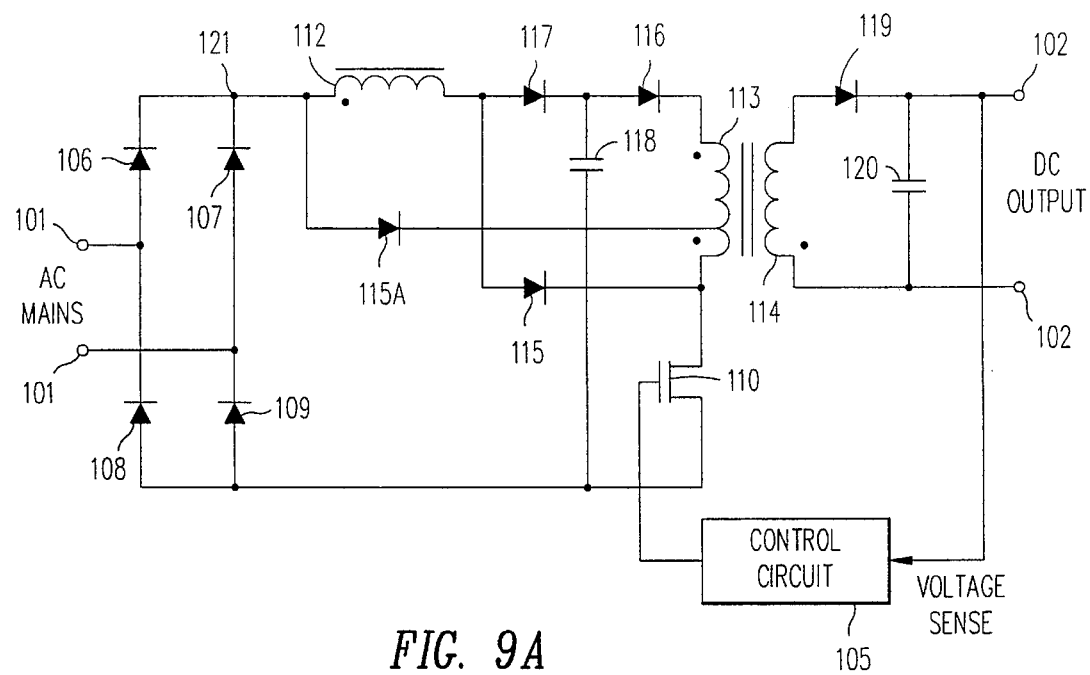
Figure 9B:
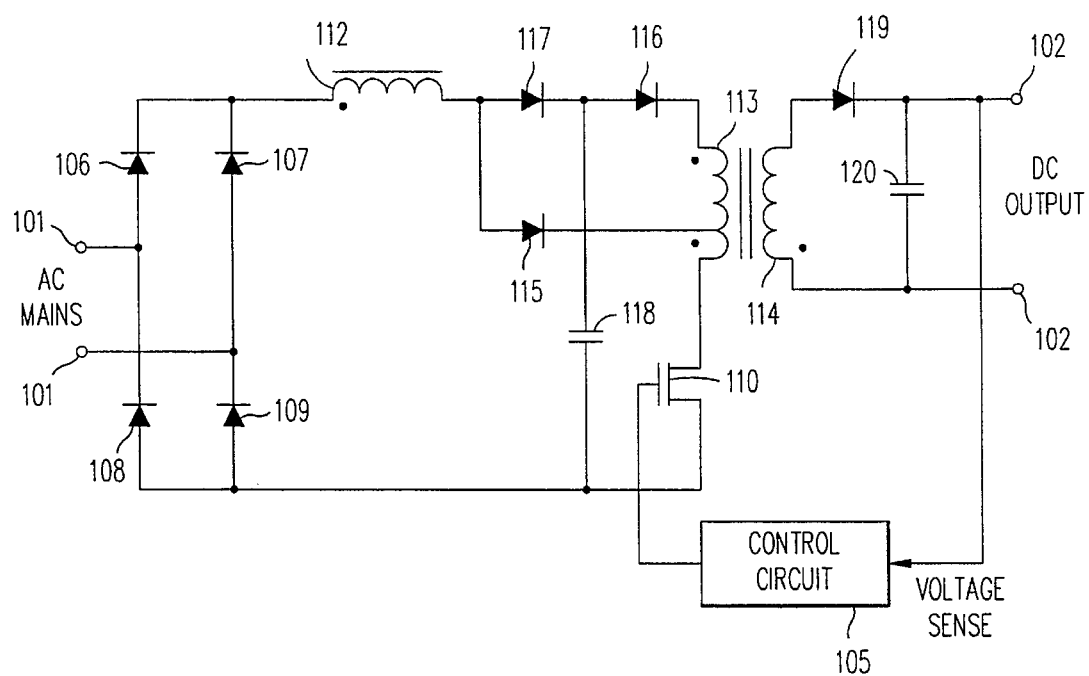
Figure 9C:
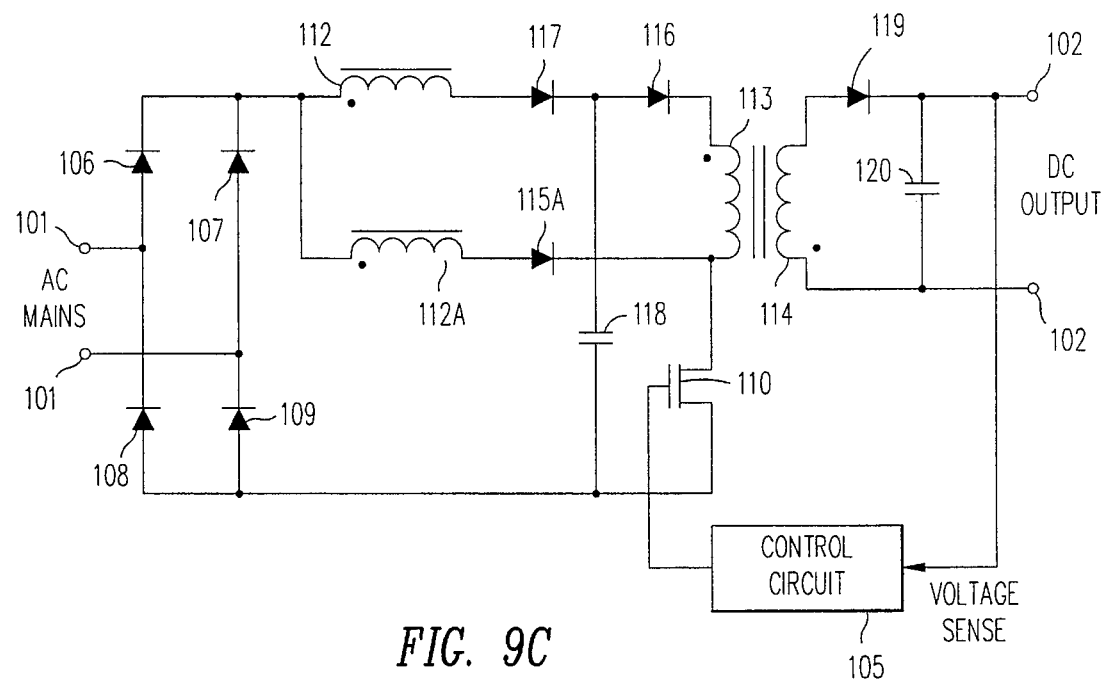
Figure 9D:
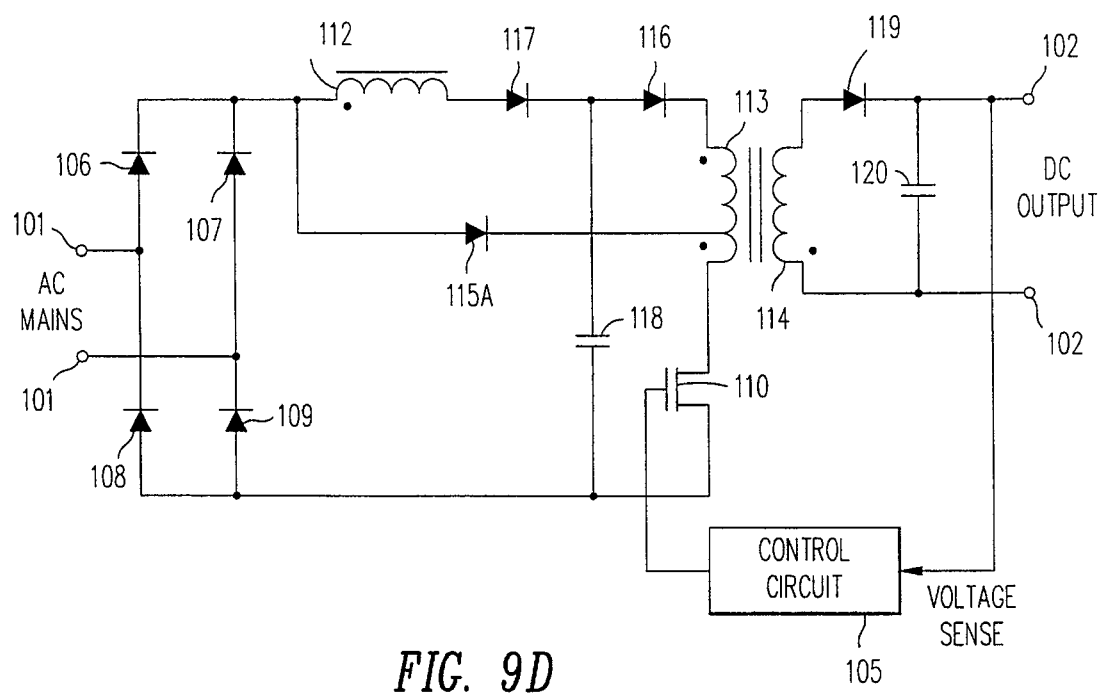
Figure 9E:
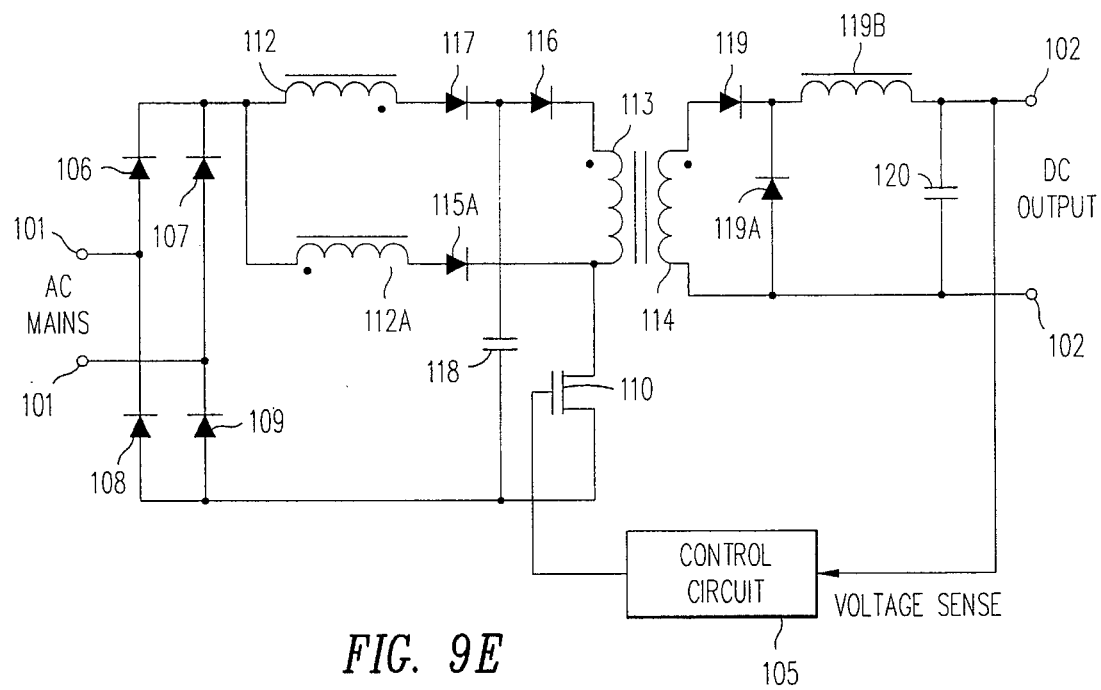
Figure 9F:
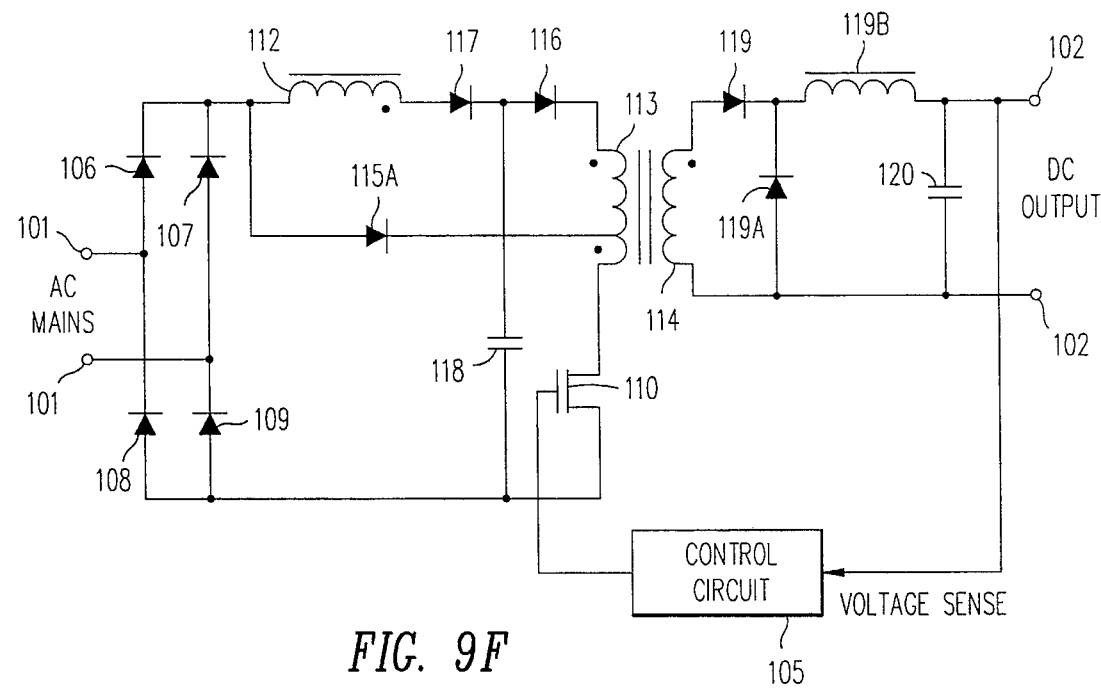
Figure 9G:
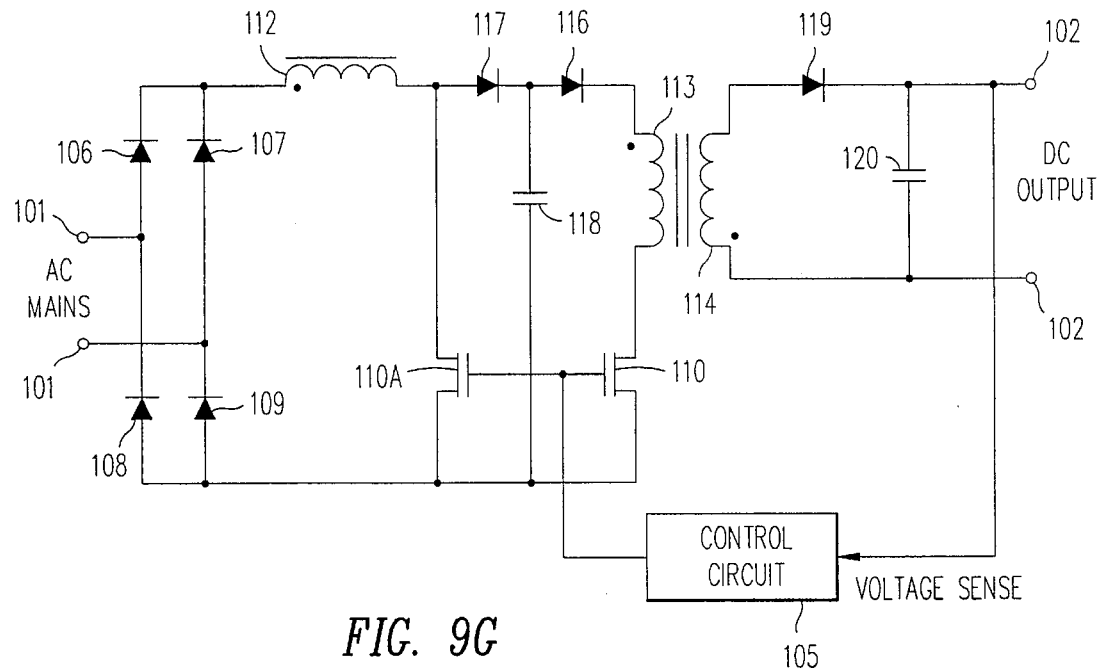
Figure 9H:
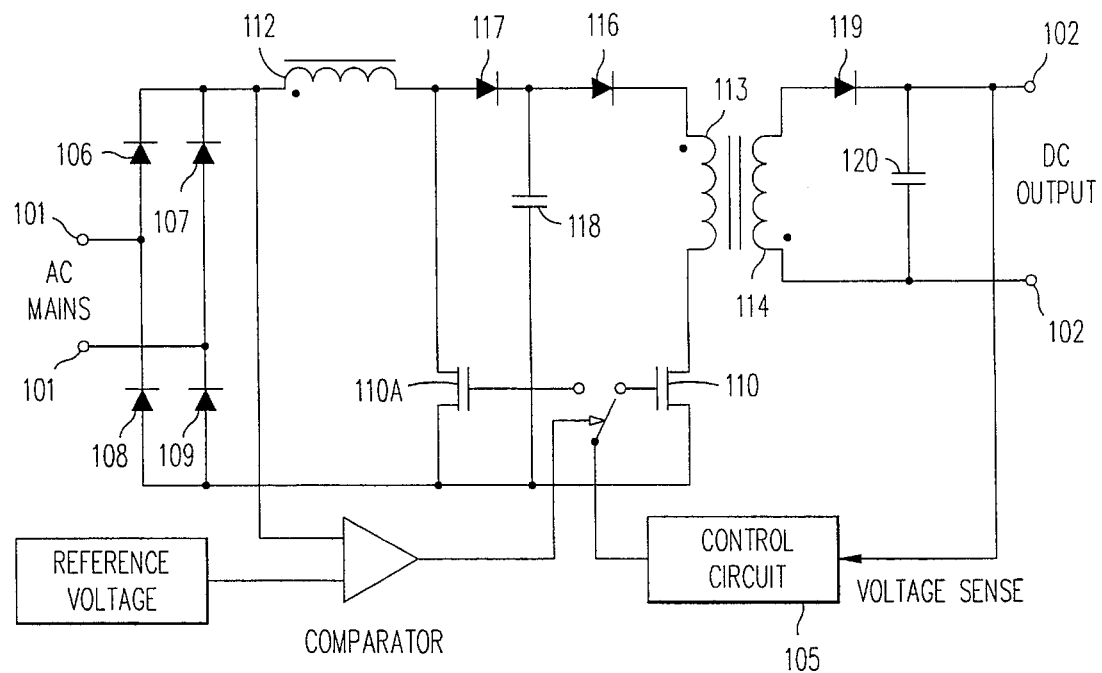
Figure 91:
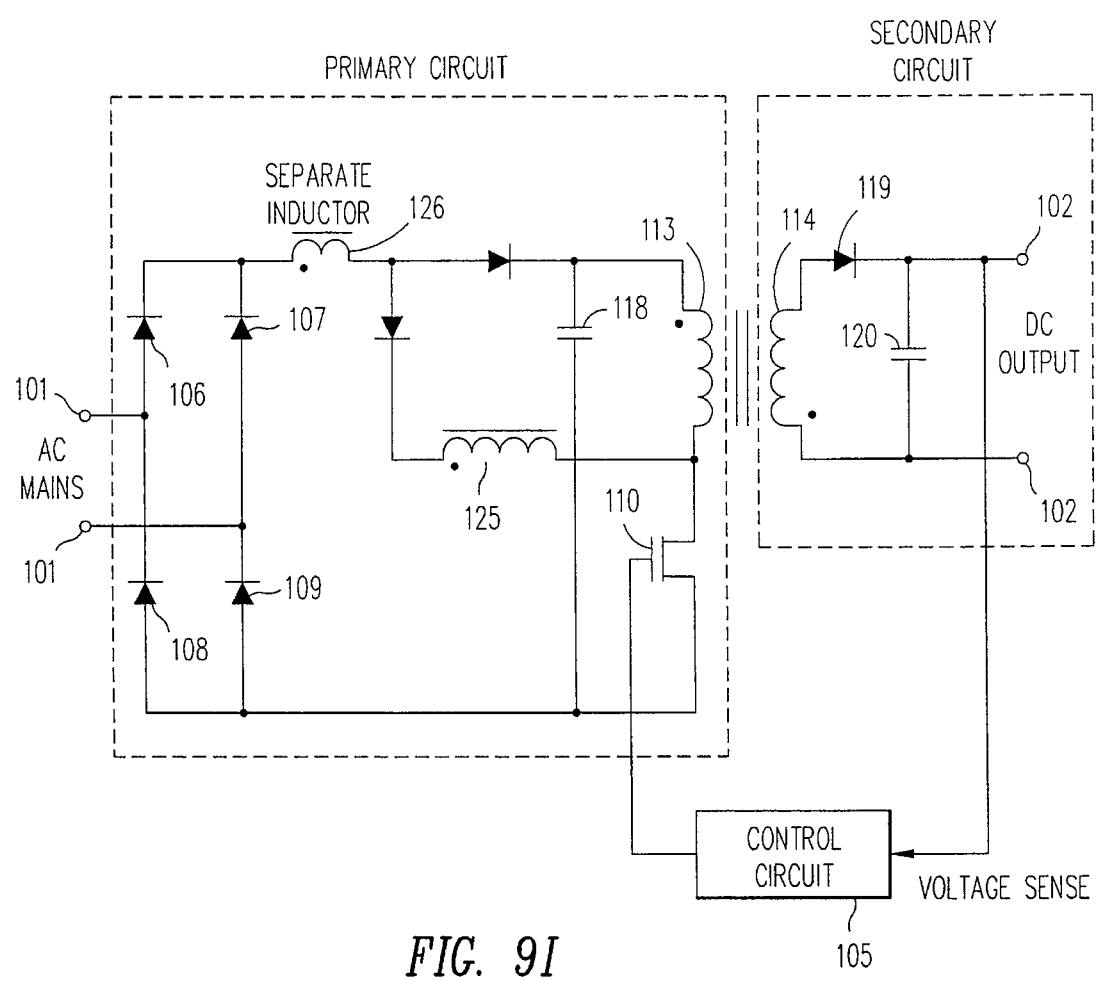

In the embodiment of FIG. 9A, an additional diode 115A is provided. The anode of diode 115A is coupled to node 121 at the output of the rectifier bridge diodes and the cathode of diode 115A is coupled to a third terminal of second primary 113 so that the input current during modes 2, 3 and 4 is shared between diodes 115 and 115A and also between winding 112 and a portion of winding 113. In the embodiment of FIG. 9B, the cathode of diode 115 is coupled to a third terminal of second primary 113 so that the total number of turns N1 for equations 1 and 3 is the sum of the turns of winding 112 and a portion of winding 113. The number of turns N1 for equation 5 is equal to the turns of winding 112. This has the effect of reducing the maximum voltage on capacitor 118 while keeping other operational characteristics the same. In the embodiment of FIG. 9C, the transformer has a third primary 112A. This third primary 112A functions in modes 2, 3 and 4 during the on time of switch 110. During the off time of switch 110, primary 112 carries the current during mode 3. The embodiment of FIG. 9D is the same as the embodiment of FIG. 9C, except that winding 112A is combined as a portion of winding 113. The embodiment of FIG. 9E is similar to that of FIG. 9C except the secondary circuit is that of a forward converter using an averaging filter consisting of diode 119A and inductor 119B. In this embodiment, primary windings 112 and 112A transform the rectified input voltage during mode 3 to charge capacitor 118 to a higher level while simultaneously providing energy transfer to the secondary during the on time of switch 110. Winding 113 utilizes energy from capacitor 118 when the input voltage is very low. The embodiment of FIG. 9F is similar to FIG. 9E except that a portion of primary winding 113 replaces primary winding 112A. The embodiment of FIG. 9F is the same as the embodiment of FIG. 9D except that the output rectifier circuit of 9E is used. The embodiments of FIGS. 9G and 9H illustrate that a second switch 110A can be employed. In the embodiment of FIG. 9G, switch 110A carries the input current during modes 2, 3 and 4 while switch 110 carries the input current during mode 1. This allows the switch to be individually rated for the current and voltage occurring in these separate circuit functions. In the embodiment of FIG. 9H, add additional comparator is added to determine the level of the rectified input voltage where power draw changes from winding 112 to winding 113 and therefore from the input mains to the storage capacitor. In the embodiment of FIG. 9I, primary 125, primary 113 and secondary 114 form a transformer. Inductor 126 is a separate inductor which may have an inductance greater than approximately 100 mH.

Although the present invention is illustrated in connection with certain specific embodiments for instructional purposes, the present invention is not limited thereto. Additional magnetic components can be added to the AC-to-DC converter for filtering. Accordingly, various adaptations, modifications and combinations of the features of the specific embodiments can be practiced without departing from the scope of the invention as set forth in the following claims.

What is claimed is:

1. An AC-to-DC power converter having AC input current terminals, comprising:

a transformer having a first primary winding, a second primary winding and a secondary winding;

a power switch;

a storage capacitor; and means for controlling said power switch such that said second primary winding is energized in a first time interval with energy previously stored in said storage capacitor and such that said first primary winding is energized in a second time interval with energy of a current flowing through said AC input current terminals.

2. The AC-to-DC power converter of claim 1, wherein said transformer is the only magnetic component of said AC-to-DC power converter.

3. The AC-to-DC power converter of claim 1, wherein said power switch is the only power switch of said AC-to-DC power converter.

4. The AC-to-DC power converter of claim 1, further comprising:

a first diode having a first terminal and a second terminal, said first terminal coupled to a terminal of said first primary winding;

a second diode having a first terminal and a second terminal, said first terminal of said second diode being coupled to said second terminal of said first diode and being coupled to a first terminal of said storage capacitor, said second terminal of said second diode being coupled to a first terminal of said second primary winding, wherein a second terminal of said second primary winding is coupled to a first terminal of said power switch, and wherein a second terminal of said power switch is coupled to a second terminal of said storage capacitor.

5. The AC-to-DC power converter of claim 1, wherein energy is transferred to the secondary winding during an off time of said switch.

6. The AC-to-DC power converter of claim 1, wherein energy is transferred to the secondary winding during an off time of said switch, and wherein substantially no energy is transferred to the secondary winding during an on time of said switch.

7. The AC-to-DC power converter of claim 1, wherein energy is transferred to the secondary winding during an on time of said switch.

8. The AC-to-DC power converter of claim 1, wherein energy is transferred to the secondary winding during an on time of said switch, and wherein substantially no energy is transferred to the secondary winding during an off time of said switch.

9. The AC-to-DC power converter of claim 1, wherein energy is transferred to said secondary winding during an off time of said switch, and wherein energy is transferred to another secondary winding of said AC-to-DC power converter during an on time of said switch.

10. An AC-to-DC power converter, comprising:

a rectifier bridge having a first input terminal, a second input terminal, a first output terminal and a second output terminal;

a transformer having a first primary winding, a second primary winding and a secondary winding, a first terminal of said first primary winding being coupled to said first output terminal of said rectifier bridge;

a first diode having a first terminal and a second terminal, said first terminal of said first diode being coupled to a second terminal of said first primary winding of said transformer;

a second diode having a first terminal and a second terminal, said first terminal of said second diode being coupled to said second terminal of said first diode, said second terminal of said second diode being coupled to a first terminal of said second primary winding of said transformer;

a power switch having a first terminal, a second terminal and a third terminal, said first terminal of said power switch being coupled to a second terminal of said second primary winding;

a capacitor having a first terminal and a second terminal, said first terminal of said capacitor being coupled to said second terminal of said power switch and also being coupled to said second output terminal of said rectifier bridge, said second terminal of said capacitor being coupled to said second terminal of said first diode;

a rectifier circuit coupled to first and second terminals of said secondary winding of said transformer; and a control circuit having an input terminal and an output terminal, said input terminal of said control circuit being coupled to a terminal of said rectifier circuit, said output terminal of said control circuit being coupled to said third terminal of said power switch.

11. The AC-to-DC power converter of claim 10, wherein said first terminal of said first primary winding is coupled to said first output terminal of said rectifier bridge by a high frequency filtering inductor.

12. The AC-to-DC power converter of claim 10, further comprising:

a third diode having a first terminal and a second terminal, said first terminal of said third diode being coupled to said second terminal of said first primary winding, said second terminal of said third diode being coupled to said second terminal of said second primary winding.

13. The AC-to-DC power converter of claim 11, further comprising:

a third diode having a first terminal and a second terminal, said first terminal of said third diode being coupled to said second terminal of said first primary winding, said second terminal of said third diode being coupled to a third terminal of said second primary winding.

14. The AC-to-DC power converter of claim 11, further comprising:

a third diode having a first terminal and a second terminal, said first terminal of said third diode being coupled to said first terminal of said first primary winding, said second terminal of said third diode being coupled to a third terminal of said second primary winding.

15. The AC-to-DC power converter of claim 11, wherein said transformer further comprises a third primary winding, a first terminal of said third primary winding being coupled to said first terminal of said first primary winding, said AC-to-DC power converter further comprising:

a third diode having a first terminal and a second terminal, said first terminal of said third diode being coupled to a second terminal of said third primary winding, said second terminal of said third diode being coupled to said second terminal of said second primary winding.

16. A method, comprising the steps of:

(a) in a first time interval of a period of an AC input voltage, transferring energy from a storage capacitor of an AC-to-DC converter to DC output terminals of said AC-to-DC converter by energizing a first primary winding of a transformer of said AC-to-DC converter with energy previously stored in said storage capacitor;

(b) in a second time interval of said period of said AC input voltage, transferring energy from AC input terminals of said AC-to-DC converter to said DC output terminals of said AC-to-DC converter by energizing a second primary winding of said transformer with a current flowing through said AC input terminals; and (c) rectifying voltages induced across said secondary winding of said transformer into a DC voltage on said DC output terminals.

17. The method of claim 16, wherein said transferring step (a) involves switching a flow of current through said first primary winding on and off multiple times such that energy is transferred from said first primary winding to said secondary winding, and wherein said transferring step (b) involves switching a flow of current through said second primary winding on and off multiple times such that energy is coupled from said second primary winding to said secondary winding.

18. The method of claim 16, wherein said first time interval is a time interval in which the absolute value of an AC voltage present on said AC input terminals is below a voltage, and wherein said second time interval is a time interval in which the absolute value of said AC voltage present on said AC input terminals is above said voltage, and wherein said first and second time intervals do not overlap.

19. The method of claim 16, wherein energy from said storage capacitor which energized said first primary winding during said first time interval is replenished in a portion of said second time interval.

* * * * *